G. P. SCHMIDT.
RECEPTACLE.
APPLICATION FILED AUG. 12, 1908.
944,696.
Patented Dec. 28, 1909.
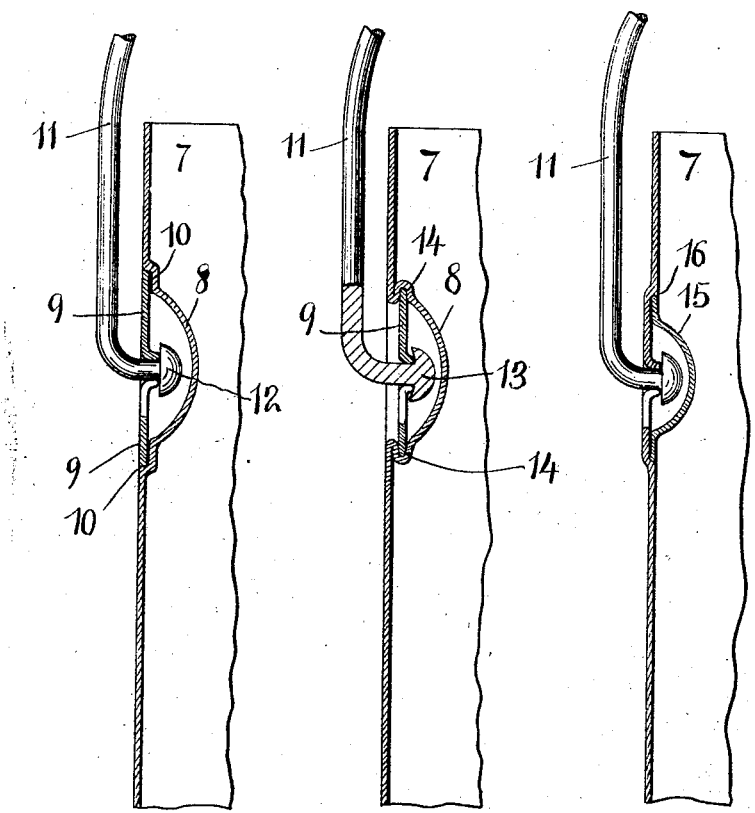
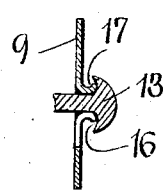 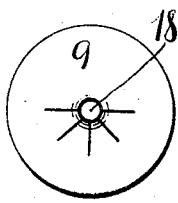 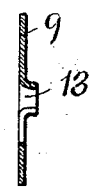
Fig. 5   Fig. 4   Fig. 6
Witnesses
Louise Enderle
Godfrey P. Schmidt, Inventor

UNITED STATES PATENT OFFICE.

GODFREY P. SCHMIDT, OF NEW YORK, N. Y.

RECEPTACLE.

944,696.  Specification of Letters Patent.  Patented Dec. 28, 1909.

Application filed August 12, 1908. Serial No. 448,110.

*To all whom it may concern:*

Be it known that I, GODFREY P. SCHMIDT, a citizen of the United States, residing at New York city, in the county of New York and State of New York, have invented certain new and useful Improvements in Receptacles, of which the following is a specification, reference being had therein to the accompanying drawing.

My invention relates to improvements in receptacles and is particularly adapted for use in the construction of cans and has been so illustrated in the accompanying drawings in which—

Figure 1 is a vertical broken section of a can showing a split member adapted to support the bail or handle of the can from the outside of the same. Fig. 2 is a modification showing the split member held within a circumferential depression formed in the side of the can, and Fig. 3 is another modification showing the bail held by the side of the can with an inner ear to protect the same. Fig. 4 is a plan view of the split member. Fig. 5 is a modification thereof showing a modified form of bail, and Fig. 6 is a cross section of the split member shown in Fig. 4.

7 is a section of an ordinary can formed with an inwardly projecting ear 8 adapted to receive the split disk 9 shown in Figs. 4 and 6 which may be soldered thereto as shown at 10.

11 is the bail or handle of the can terminating in the head 12 which may be pressed through the opening 18 in the disk 9 for the purpose of securing the bail or handle to the can.

In the modification shown in Fig. 2 the inwardly extending ear is preferably given an internal circumferential groove 14 to hold the disk 9 instead of using solder as shown in Fig. 1. The head 13 of the bail or handle 11 may also be forced downwardly in the direction of the stem of the handle for the purpose of forming a recess to engage the edges of the split disk 9 as shown in Fig. 2.

In the modification shown in Fig. 3 the use of the disk shown in Figs. 4 and 6 may be omitted and the side of the can may be slitted to allow for the introduction of the head of the bail and a curved ear piece 15 may be soldered to the inside of the can as at 16.

In the modification shown in Fig. 5 the underside of the head of the bail is preferably curved as shown at 16 so that after the head has been inserted through the opening any tendency to withdraw the same causes the ends of the tin to curl up as shown at 17, the same being interlocked with the curved under face of the head 16 thereby securely holding the bail in place.

Various other modifications may be made without departing from the spirit of the invention.

Having described my invention, what I claim as new, and desire to secure by Letters Patent, is:

1. In a receptacle, a handle provided with a head, a recess beneath said head, said receptacle having slitted portion to receive said head, and the ends of said slitted portion being adapted to engage said recess when said handle is pulled from said can.

2. In a receptacle, a handle provided with a head, said receptacle having slitted portion to receive said head, and an ear piece on the inside of said receptacle to cover said head.

3. In a receptacle, a handle provided with a head, a recess beneath said head, a slitted member being adapted to receive said head, and the ends of said slitted portion of said member being adapted to engage said recess when said handle is pulled from said can.

In testimony whereof I affix my signature in presence of two witnesses.

GODFREY P. SCHMIDT.

Witnesses:
LOUISE ENDERLE,
THOMAS A. HILL.